Figure 1:
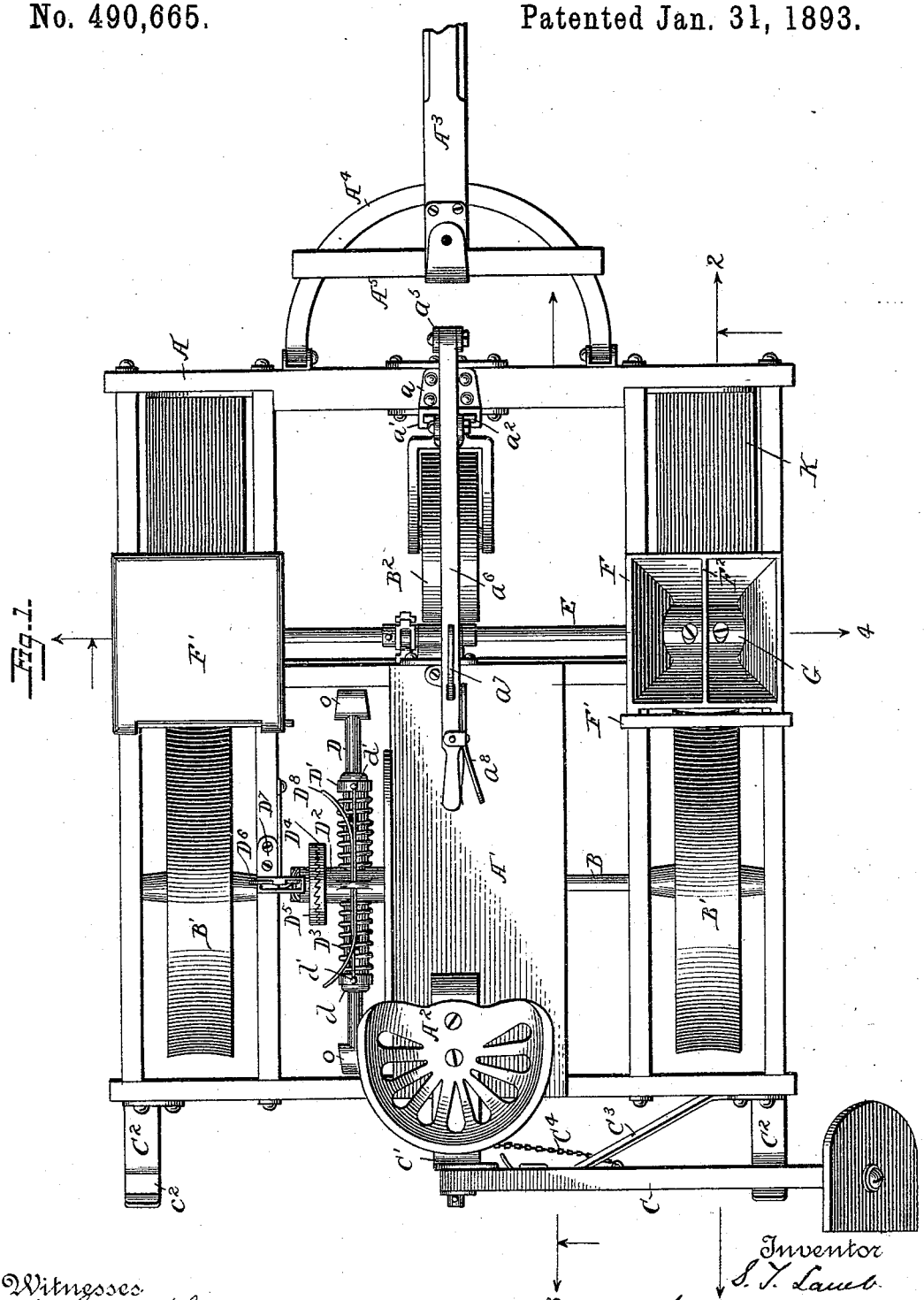

(No Model.) 3 Sheets—Sheet 1.

S. T. LAMB.
CORN PLANTER.

No. 490,665. Patented Jan. 31, 1893.

Witnesses
Jno. G. Hinkel
H. S. McArthur

Inventor
S. T. Lamb
by Foster & Freeman
Attorneys (No Model.) 3 Sheets—Sheet 2.
S. T. LAMB.
CORN PLANTER.
No. 490,665. Patented Jan. 31, 1893.
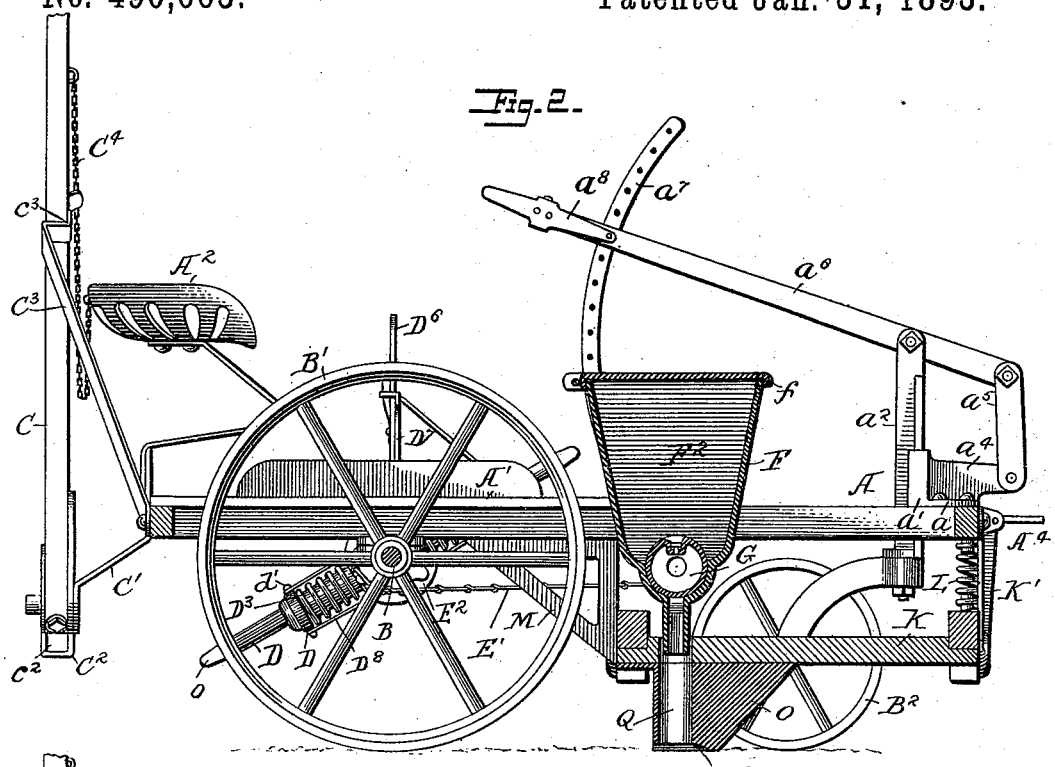
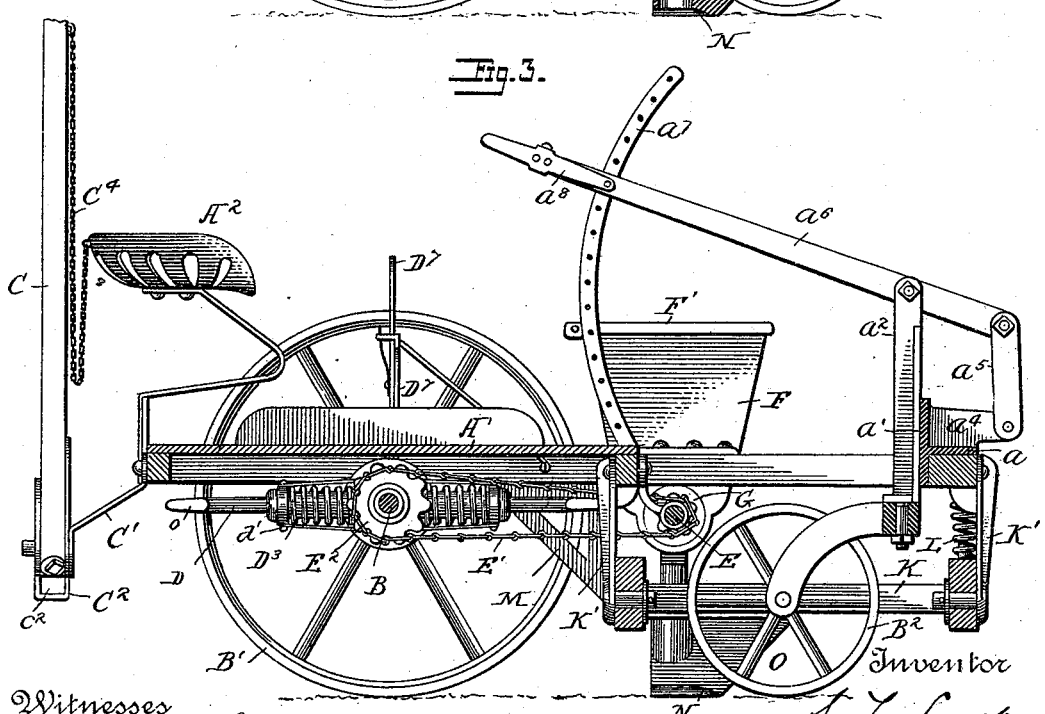
Witnesses
Jno. G. Hinkel
H. S. McArthur
Inventor
S. T. Lamb
By Foster & Freeman
Attorneys (No Model.) 3 Sheets—Sheet 3.
S. T. LAMB.
CORN PLANTER.
No. 490,665. Patented Jan. 31, 1893.
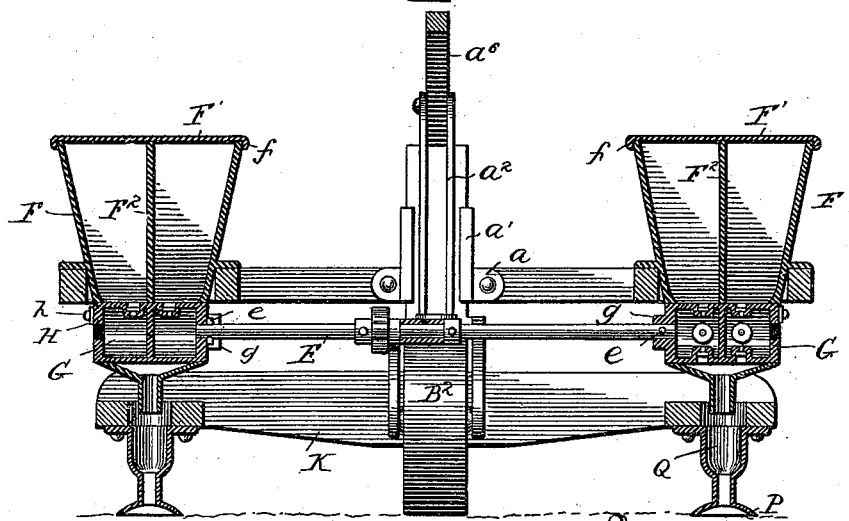
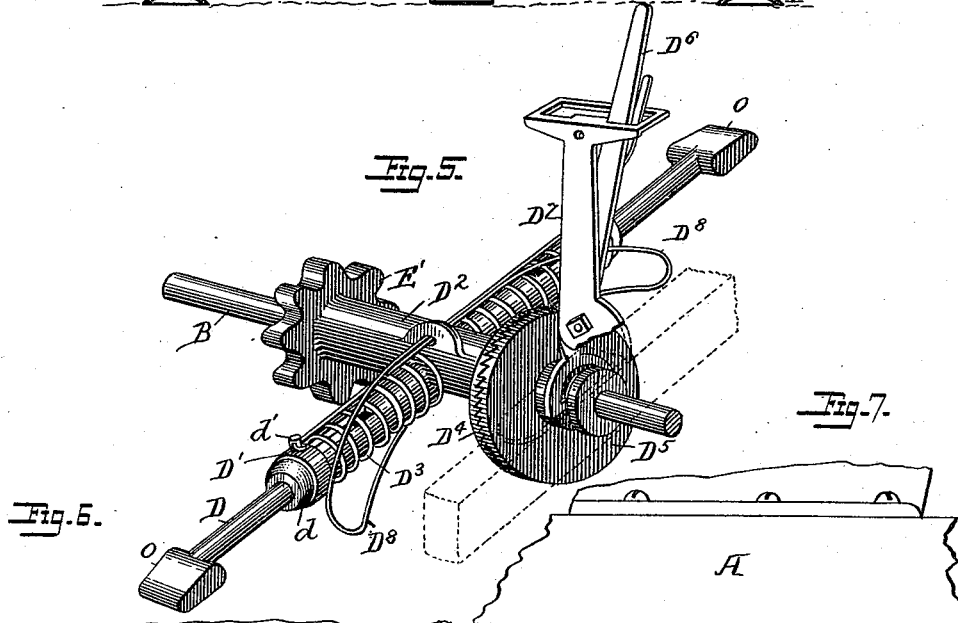
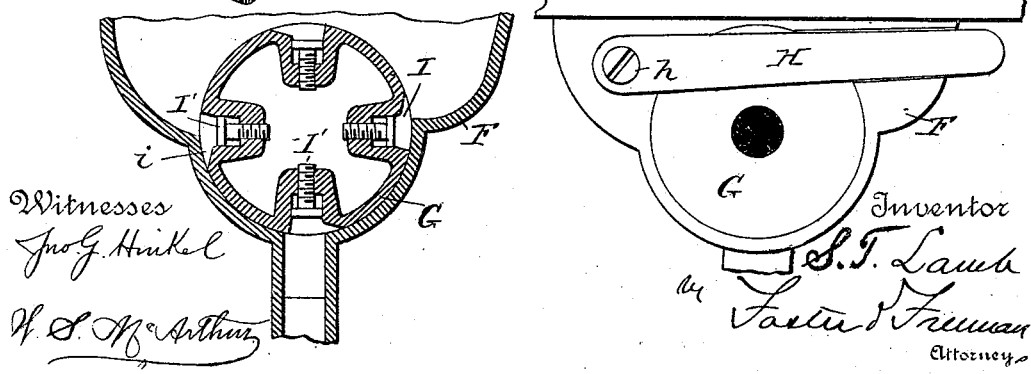
Witnesses
Jno. G. Hinkel
H. S. McArthur
Inventor
S. T. Lamb
by Foster & Freeman
Attorneys

UNITED STATES PATENT OFFICE.

SALEM T. LAMB, OF NEW ALBANY, INDIANA.

CORN-PLANTER.

SPECIFICATION forming part of Letters Patent No. 490,665, dated January 31, 1893.

Application filed August 24, 1891. Serial No. 403,638. (No model.)

*To all whom it may concern:*

Be it known that I, SALEM T. LAMB, a citizen of the United States, residing at New Albany, Floyd county, State of Indiana, have invented certain new and useful Improvements in Corn-Planters, of which the following is a specification.

My invention relates to corn planters, and more particularly to that class of corn planters in which the seed is automatically dropped either in hills or in rows for drilling, and at the same time a fertilizer is applied with the corn, and in the operation of planting, the ground is marked by the machine both longitudinally and transversely, so that the operator or driver can lay off a field to mark rows two ways without the use of a wire or other appliance, or the assistance of any extra hands.

The object of my invention is to improve and simplify this class of machines, and render them capable of performing the desired functions under many and various conditions, so as to meet the requirements of a general planting device, and at the same time to provide a machine which will be simple in construction, and certain in its operation, and not liable to get out of order.

To these ends my invention consists in a planter embodying the features of construction and mode of operation substantially such as are pointed out more particularly hereinafter.

Referring to the accompanying drawings wherein I have illustrated the preferred embodiment of my improvements, Figure 1, is a plan view of a planter; Fig. 2, is a longitudinal vertical section of the planter on the lines 2—2 Fig. 1; Fig. 3, is a similar view on the lines 3—3, Fig. 1; Fig. 4, is a vertical transverse section on the lines 4—4 Fig. 1; Figs. 5, 6, and 7 are detail views.

In carrying out my invention, I have shown a planter as provided with a main frame A, which is substantially rectangular in shape, and is supported upon a main driving axle B, carrying at each end the wide grooved wheels B', which not only form supports for the planter, but serve to cover the seed or corn which has been planted. The frame is provided with a suitable platform A' to which is attached a seat $A^2$ for the driver. To the front portion of the frame is attached the tongue $A^3$ by any suitable means, preferably in the manner shown in the drawings, in which there is a semi-circular plate $A^4$ pivotally attached to the forward portion of the frame and on which is secured a cross bar $A^5$, to which the end of the tongue is attached, suitable means being provided for the attachment of the whiffletree or draw-bar. The forward portion of the frame is supported upon a caster wheel $B^2$, and this wheel is mounted so that the forward portion of the frame can be raised or lowered by the driver to regulate the depth of planting of the seed in the manner hereinafter described.

Attached to the frame A is a plate $a$, having a vertical channel plate $a'$, in which moves the sliding plate $a^2$, as best seen in Fig. 4, to which sliding plate the caster wheel is attached in the usual way. Mounted on the plate $a$ is a vertical ridge $a^4$, to which is pivoted a link $a^5$, the other end of which is connected to a hand lever $a^6$, to which the slide $a^2$ is pivoted. Mounted on the platform A' is a curved bar $a^7$ provided with a series of orifices, and the lever $a^6$ is provided with a catch lever or pawl $a^8$ adapted to engage the orifice, the lever being arranged to slide over the curved bar, as seen in Fig. 1. By this means it will be readily seen that the forward end of the planter may be raised or lowered to the desired extent by the driver, and is of more particular advantage when in turning corners in the field, or in passing from one field or farm to another, it is desired not to have the operating mechanism interfere in any way with the ground, or any obstructions thereon. More than this, the depth of planting the seed can be nicely regulated.

I provide my planter with means whereby the planting can be done in rows two ways at right angles to each other without the necessity of using any other appliances than are embodied in the planter itself. For this purpose I use two markers, one of which I term the longitudinal marker to mark the rows parallel to the rows being planted, and the other a transverse or cross marker to indicate the position of the row at right angles to the rows being planted.

C represents the longitudinal marker, and this is shown pivoted to a brace or arm C' extending from the rear of the main frame, and is adapted to lie upon and be supported by one of the arms or supports $C^2$ attached to the rear of the frame at either side of the seat according as to whether the marker is to operate on one or the other side of the planter. These arms or supports are formed with notches $c^2$ to engage the marker arm, and prevent its being wrenched out of place. When the marker arm is not in operation as in turning corners or in traveling from place to place it is held by the spring support $C^3$ projecting upward from the rear portion of the frame, and having a notch $c^3$ for engaging the marker.

In order that the marker may be worked from the driver's seat, I attach to the marker at some convenient place, a cord or chain $C^4$, the other end of the chain being preferably connected to the rear of the driver's seat, and by this means the driver can raise the marker, and shift it from one side to the other, or to its normal position in the supporting arm without moving from his position.

The transverse marker is shown as consisting of two arms D, which slide or work into two hollow arms D', mounted upon a sleeve $D^2$ which is loose upon the main axle B. These arms D are provided with collars $d$ sliding over the hollow arms, the collars being connected to the arms D by a pin $d'$, and interposed between these collars and the sleeve are springs $D^3$, shown as spiral springs surrounding the hollow arms. These springs normally keep the arms D extended, but permit of the retraction of the arms when they come in contact with any hard substance which would be liable to injure or derange the operation of the machine. The arms are provided with heads $o$ at the extremities, which are preferably solid, and have laterally extending portions forming a base line at right angles to the arms, and by means of this form of head, I find I am able to make a good, plain, and distinctive mark in the soil. The sleeve $D^2$ on which the arms are mounted is provided with a disk $D^4$ forming one member of a clutch, the other member $D^5$ of which is splined to the main axle, and a lever $D^6$ is connected to an upright $D^7$ attached to the frame, and operates to move the sliding portion of the clutch on the main axle to engage and disengage the portion of the clutch on the sleeve. This lever is within easy reach of the driver from his seat, and is provided with the usual locking device for holding it in either position. This clutch is made with a series of notches or teeth on each member, they preferably being quite near together, in order that the parts of the clutch will engage and operate without loss of time or motion.

To enable the driver to set the transverse or cross marker in proper lines at the beginning of each row, it is only necessary for him to throw the clutch out of engagement, and then by hand to turn the transverse marker, so that it will be in the exact position desired on starting. In order that he can readily raise the lowermost bar from his seat, I provide loops $D^8$, as best seen in Fig. 5, which engage the collars of the opposite marker arm, and embrace the sleeve and extend to the collars of the opposite marker arm within convenient reach of the driver, and by means of which he can raise the lower marker, so that it can be set backward or forward as is necessary before the travel of the machine commences. The clutch is then closed, and as the machine advances, the transverse marking will be accurately made automatically by the machine.

Mounted on the frame in a suitable support is a counter shaft E, and this is connected to be driven by a sprocket wheel $E^2$ on the sleeve $D^2$, and to this counter shaft are connected droppers in a manner hereinafter described.

The hoppers F are mounted upon the frame at each side in front of the main wheels B', and these hoppers are provided with covers F' hinged to the rear side thereof, and these covers are provided with flanges $f$ extending downward from all sides, and adapted to embrace and tightly close the hoppers preventing moisture or other extraneous matter getting into the hoppers, as well as preventing the material in the hoppers getting out. The hoppers are preferably divided into two parts by a partition $F^2$, one part being for the corn or other grain to be planted, and the other part for the fertilizer. The lower part of the hopper is formed into a hollow cylinder for the reception of the droppers, and below this the hopper is formed into a chute or tube through which the grain and fertilizer are delivered together into the ground.

The droppers G arranged in the hollow cylindrical portions of the hoppers consist of cylinders preferably of metal, although they may be otherwise made, and are arranged to fit on the ends of the counter shaft. The cylinders are provided with a reduced extension $g$, having a transverse slot into which fits a pin $e$ on the counter shaft, so that when the cylinders are in position, they will turn with the counter shaft, but can be readily removed therefrom for the purposes of adjustment or otherwise. The cylinders are held in position by a spring or arm H, pivoted to the outside of the hoppers, as at $h$, and the frame of the hopper is recessed to receive this spring, as clearly shown in Fig. 7. When in position the arm bears on the end of the cylinder, and holds it in the hopper. These cylinders are provided with recesses I in their periphery, and fitting in each recess is a screw I', which can be adjusted to a greater or less depth in the recess to regulate the amount of grain or fertilizer to be distributed. There may be any desired number of these openings, according to the work desired. Thus for planting in hills, there may be one or two openings on opposite sides of the cylinder, according as the machine is geared, so that the hills will be the desired distance apart. When, however, the grain is to be planted in drills, there may be a greater number of recesses, four being shown in Fig. 6. These recesses or openings in the cylinder are made of a peculiar shape, in order to prevent them from breaking the kernels of corn or other grain in the hopper, and as clearly shown in Fig. 6, I have cut away the rear portion of the recess as at $i$, so that when the cylinder is turning to the right in Fig. 6, any kernels of corn or grain that cannot be fully received in the recess, will be pushed back into the main body of corn in the hopper, before it will be broken, and in this way I am able to preserve the integrity of the grain, and at the same time accurately measure the amount to be dropped at each dropping.

Arranged in the front part of the planter beneath the main frame, is a pivoted frame K, which is supported upon suitable hangers K', depending from the main frame. Interposed between the pivoted frame, and the front bar of the main frame are springs L, which serve to hold the pivot bar in its normal position, but to allow it to yield to prevent injury to the parts carried thereby. Arranged on the longitudinal bars of the main frame and projecting downward, are the braces M, their forward faces being arranged adjacent to the pivoted frame and they operate to brace and keep the frame steady, and to receive the shock or pressure, if perchance, the frame or parts connected thereto meet with any serious obstruction.

Attached to the pivoted frame, and arranged to correspond with the spouts of the hoppers, are the shoes N, and these consist essentially of a vertical blade O, having an inclined sharp edge, so as to open the ground, and provided with lateral flanges P on each side, which tend to lift the earth. These shoes operate to run into and under the ground, and furnish a place for the deposit of the grain, lifting the ground up while the dropping is done. The under surface of the shoes at the rear portion is concave, and this permits the corn to be deposited in the opening made in the earth without being dragged out of position, and the earth will fall back over the ground, and be pressed down by the following covering wheel, which also is provided with a concave rim. As the shoes pass along, the earth falls back to place covering the grain, and the main wheel following, runs over the earth, and makes the covering of the corn perfect. The shoes being fastened to the pivoted frame, they are allowed to yield to the unevenness of the ground, so that the depth of planting or drilling may be uniform. It will be understood of course that there is a passage Q through the rear portion of the shoes, corresponding with the delivery tube of the hopper.

From the above description it will be seen that my device presents a complete planting, drilling and fertilizing machine, which is simple in construction, and yet which performs the operations desired in a most advantageous manner, enabling the grain and fertilizer to be deposited simultaneously, the amount to be regulated, the grain and fertilizer to be protected from the elements, the field to be thoroughly marked and laid out for even planting, and all is controlled by the driver from his seat on the platform.

While I have thus described and illustrated what I consider to be the most practical embodiment of my invention, it is evident that the details of construction and arrangement may be varied by those skilled in the art to meet the necessities of any particular case, without departing from the spirit of my invention, and parts of the device may be used in combination with other parts, or their equivalent parts.

What I claim is:

1. The combination with the frame of the machine, supported on a rotating axle mounted on wheels, of the longitudinal marker pivotally attached to the frame, and a transverse marker loosely mounted upon said axle, and carrying one member of a clutch, the other member of the clutch being splined to and movable upon said axle, and means for shifting the latter clutch member, substantially as described.

2. In a corn planter, the transverse marker comprising tubes, the spring actuated marker arms moving in the tubes, and the loops engaging the marker arms for the purpose of raising them, substantially as described.

3. The combination with the rotating axle of the planter, of the sleeve mounted thereon, hollow arms connected to the sleeve, spring actuated transverse marker arms sliding in said hollow arms, a clutch mounted on the axle and connecting the sleeve to the latter, the clutch having a large number of teeth for the purpose of securing accurate adjustment, substantially as described.

4. The combination with the main shaft, of a sleeve mounted thereon, hollow slotted tubes projecting therefrom, marker arms sliding in said tubes, collars connecting the tubes and arms, springs interposed between the collars and the sleeve, and the loops connected to the collars and extending beyond the sleeve, substantially as described.

5. The combination with the hoppers and counter shaft, of the cylinders removably mounted within the hoppers, and upon and connected with said shaft, and an arm connected to the hopper and extending across the end of the cylinder therein for retaining the cylinder in position, substantially as described.

6. The combination with the counter shaft having cross pins near its ends, of the cylinders each having a reduced inner end portion provided with a slot adapted to engage one of the cross pins, the cylinders being removably supported in the hoppers and driven by the shaft, and an arm pivoted to each hopper and extending across the outer end of the cylinder therein, substantially as described.

7. The combination with the main frame, of the pivoted frame connected thereto, springs interposed between the main and pivoted frame, and braces connected to the main frame and arranged adjacent to the rear portion of the pivoted frame, substantially as described.

8. The combination with the hoppers having chutes for the delivery of the grain, the hoppers being mounted upon the main frame, of a pivoted frame connected to the main frame by pivots extending lengthwise thereof and carrying shoes arranged to embrace the chutes, substantially as described.

9. The combination with the hoppers having chutes, cylinders in the hoppers for delivering the grain into the chutes, of a centrally pivoted frame connected to the main frame by pivots extending lengthwise thereof and carrying shoes, the shoes being perforated to receive the chutes of the hoppers, substantially as described.

10. In a corn planter the combination of the main frame, of the supplemental frame pivoted longitudinally to the main frame, the hoppers mounted on the main frame and delivering the grain through shoes attached to the supplemental frame, the caster wheel and means for adjusting the same, whereby the main frame may be adjusted to accommodate itself to the wheel and the supplemental frame is automatically adjusted, substantially as described.

11. In a corn planter the combination of the main frame, of the covering wheels, the supplemental frame pivotally connected to the main frame and cutting shoes in line with the covering wheels, the hoppers arranged to deliver the grain to the shoes, a longitudinal marker connected to the frame, a transverse rotary marker also connected to the frame, a caster wheel and means for adjusting the frame in relation thereto, substantially as described.

In testimony whereof I have signed my name to this specification in the presence of two subscribing witnesses.

SALEM T. LAMB.

Witnesses:
GEORGE B. CARDWILL.
JOHN HIEB.